(12) United States Patent
Kim et al.

(10) Patent No.: US 8,040,438 B2
(45) Date of Patent: Oct. 18, 2011

(54) METHOD FOR CHANNEL CHANGE IN DIGITAL BROADCASTING

(75) Inventors: Seung Hak Kim, Seoul (KR); Bo Kyoung Yoon, Seoul (KR); Hoon Park, Seoul (KR)

(73) Assignee: Castis Co., Ltd., Seoul (KR)

( * ) Notice: Subject to any disclaimer, the term of this patent is extended or adjusted under 35 U.S.C. 154(b) by 1065 days.

(21) Appl. No.: 11/898,924

(22) Filed: Sep. 17, 2007

(65) Prior Publication Data

US 2009/0077581 A1    Mar. 19, 2009

(51) Int. Cl.
*H04N 7/26*    (2006.01)

(52) U.S. Cl. ...... 348/731; 348/725; 455/3.01; 455/3.06; 725/38

(58) Field of Classification Search ........................ None
See application file for complete search history.

(56) References Cited

U.S. PATENT DOCUMENTS

| | | | |
|---|---|---|---|
| 7,366,462 B2 * | 4/2008 | Murali et al. | 455/3.06 |
| 2007/0280298 A1 * | 12/2007 | Hearn et al. | 370/498 |

* cited by examiner

*Primary Examiner* — William Trost, IV
*Assistant Examiner* — Oschta Montoya
(74) *Attorney, Agent, or Firm* — The Nath Law Group; Jerald L. Meyer; Stanley N. Protigal

(57) ABSTRACT

The present invention offers a method for channel change in digital broadcasting consisting of: a step 1 for recognizing a command for a channel change while the currently connected channel is being decoded at the digital broadcasting terminal; a step 2 for completing reception of the current stream while maintaining the received picture if there is a command for a channel change according to said step 1; a step 3 for receiving and analyzing the information of the newly concatenated stream without re-initializing the decoder and concatenating two streams; and a step 4 for renewing information of the newly concatenated stream in order to maintain continuity between the previous stream and the newly concatenated stream using the information obtained in said steps 2 and 3. Therefore, time delay during channel change will be minimized by changing channels without decoder re-initialization and without break in the channel changing time.

16 Claims, 4 Drawing Sheets

[Fig 1]
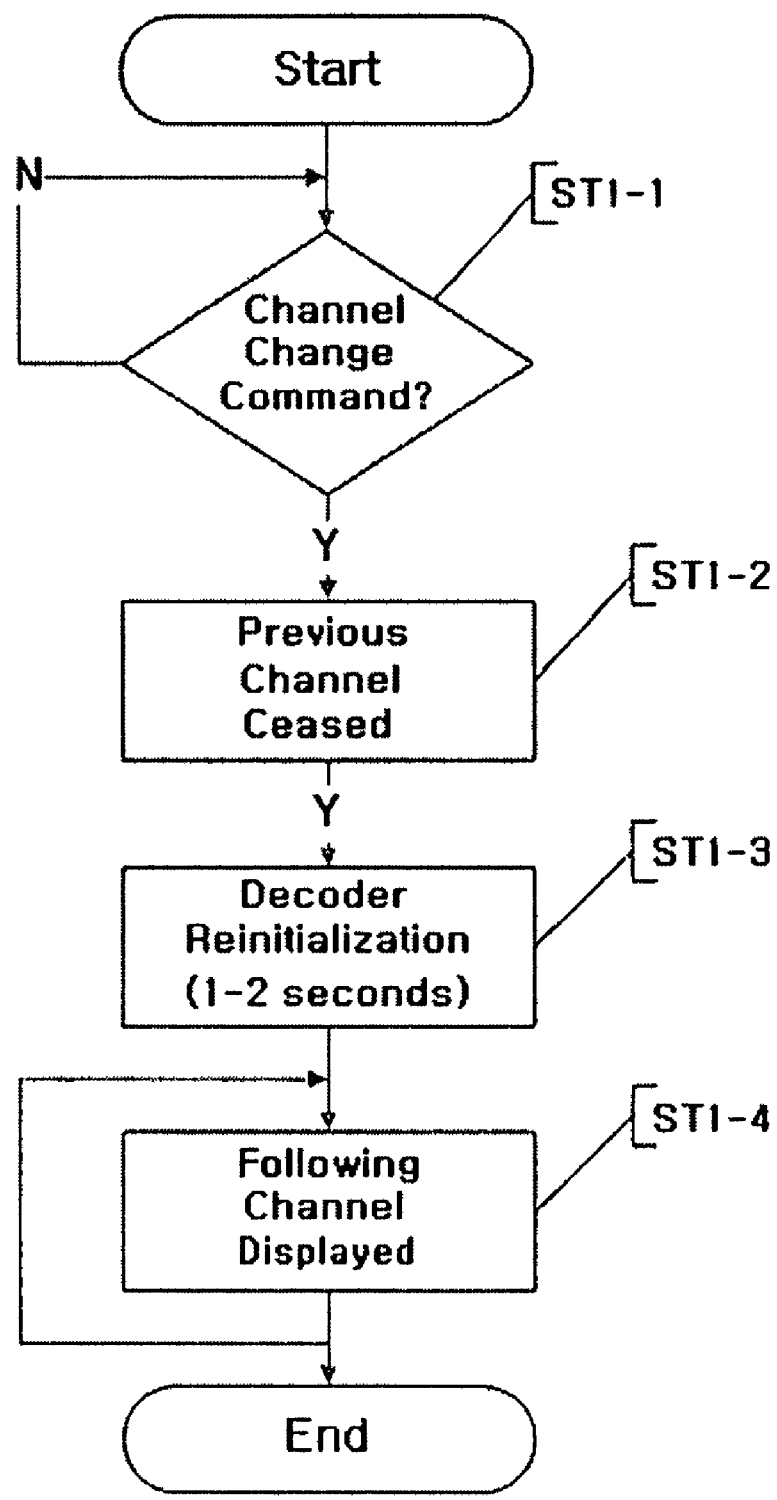

[Fig 2]
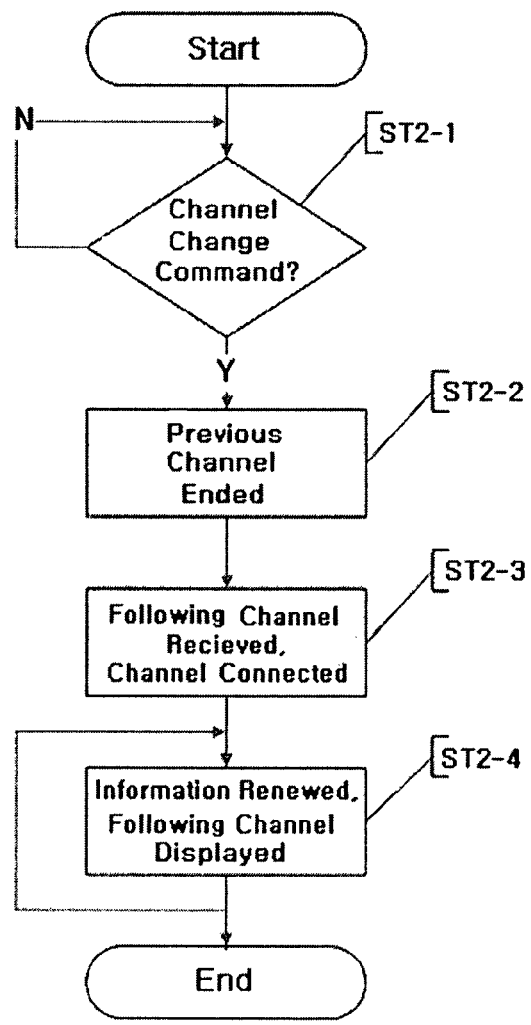
[Fig 3]
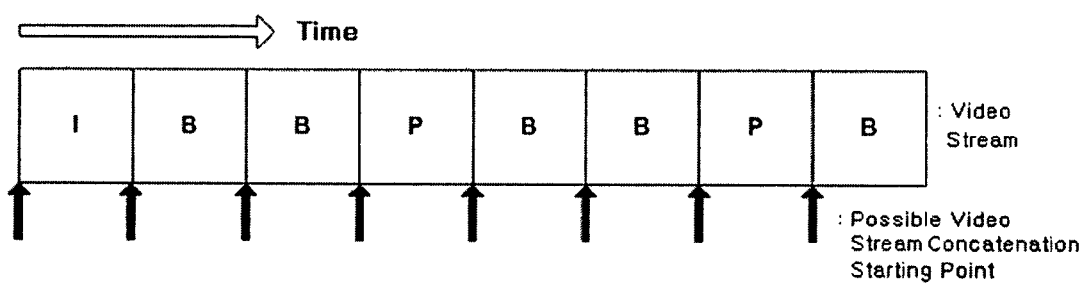

[Fig 4]
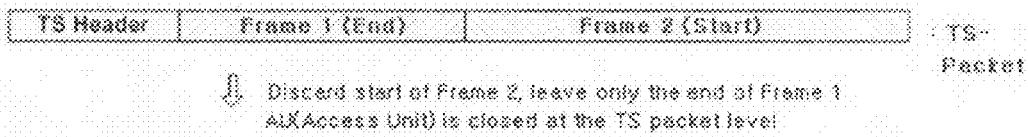
[Fig 5]
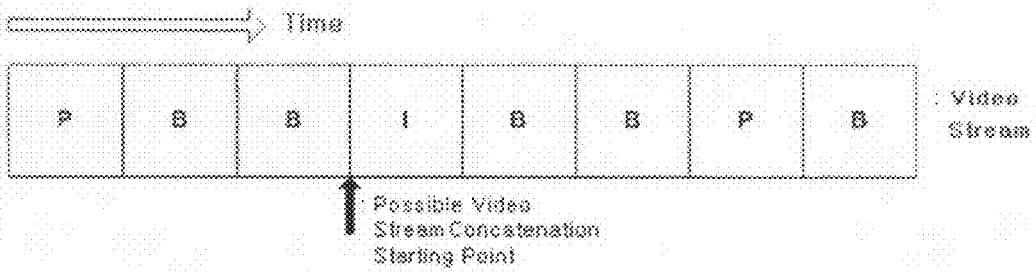
[Fig 6]
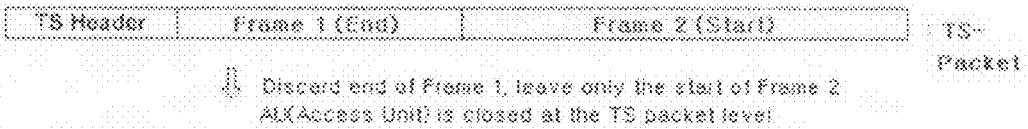
[Fig 7]
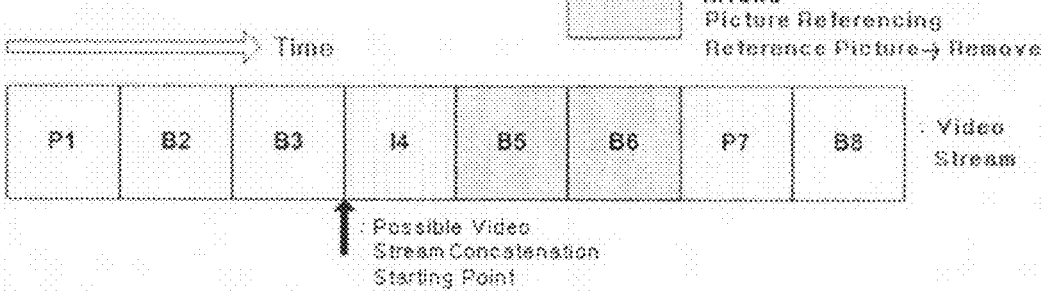

[Fig 8]
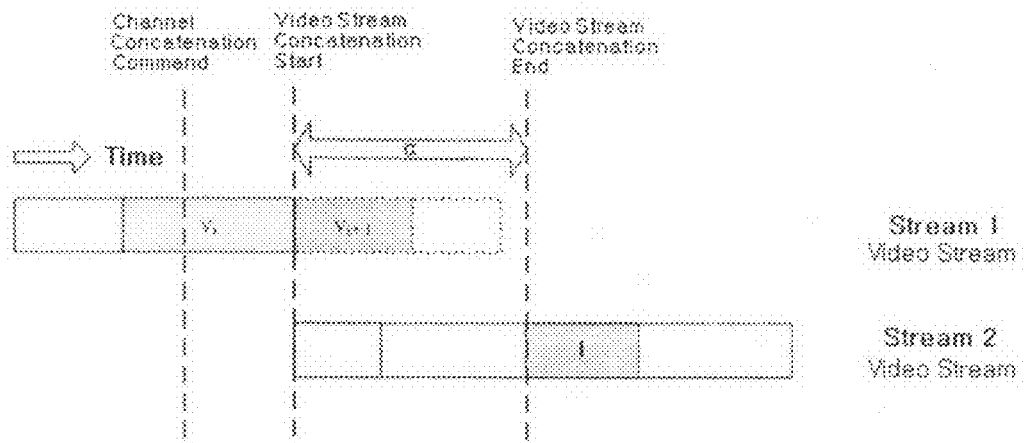
[Fig 9]
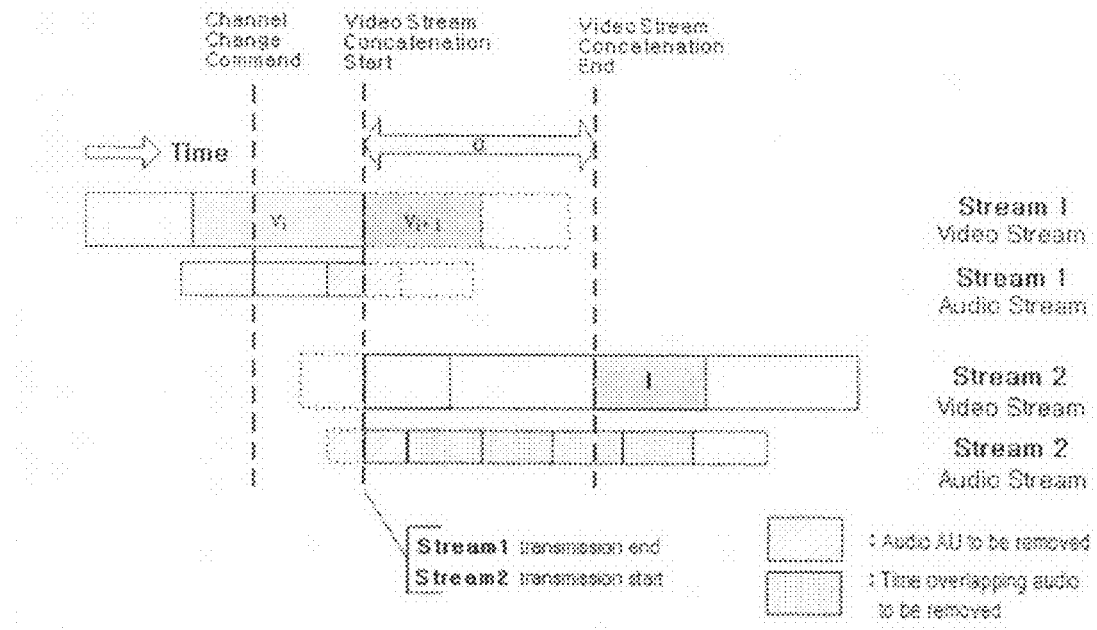

METHOD FOR CHANNEL CHANGE IN DIGITAL BROADCASTING

TECHNICAL FIELD

The present invention relates to digital broadcasting, more specifically the present invention relates to a method for channel change in digital broadcasting adapted to remove black picture in between channel changes by minimizing time delay with no re-initialization of the decoder and being concatenated to one channel.

By encoding image/sound to digital data, a wide range of services are provided to the viewer terminal or set-top box through network transmission, such as digital satellite broadcasts, digital cable broadcasts, digital network broadcasts, DMB (Digital Multimedia Broadcasting), IPTV (Internet Protocol Television) etc. These services are all hereupon included in the general concept of digital broadcasting of the present invention.

BACKGROUND ART

FIG. 1 is a flow diagram showing the conventional channel changing method of a digital broadcasting terminal.

As shown in the FIG. 1, if there is a command for a channel change (ST1-1), the previous channel is first stopped (ST1-2). Then, the decoder of the digital broadcast terminal is reinitialized (ST1-3). At this point, the duration of time that has passed is approximately 1-2 seconds. The following channel is then played (ST1-4).

In this conventional manner, every time there is a digital broadcast channel change, the digital broadcast set top box (STB) decoder is reinitialized.

Thus, according to conventional techniques, every time the decoder is reinitialized there is a 1-2 second pause, at which time the TV screen becomes blank before the next channel appears. This 1-2 second delay and black picture creates a disturbance for the viewer and thus is a problem of the conventional digital broadcast channel changing method.

TECHNICAL PROBLEM

In order to find a solution for the said problems of the conventional digital broadcast channel changing method, the objective of the present invention offers a solution to the various technical problems mentioned thus far, by providing a novel method for channel change in digital broadcasting adapted to remove black picture in between channel changes by minimizing time delay with no re-initialization of the decoder and being concatenated to one channel.

TECHNICAL SOLUTION

With reference to the drawings, one embodiment according to the present invention is described hereinbelow.

FIG. 2 is a generalized flow diagram of one example of the method for channel changing in digital broadcasting according to the present invention.

As shown in FIG. 2, the method according to the present invention comprises:

i) A step (ST2-1) of detecting a channel change, while the currently connected channel is being decoded and is playing in the digital broadcast terminal; ii) a step (ST2-2) of starting the process of video stream concatenation, ending the previous channel, and maintaining the video of the previous channel when a channel change command is given; iii) a step (ST2-3) of receiving, analyzing, and concatenating the new channel data; iv) a step (ST2-4) of receiving and modifying newly concatenated channel information based on the information obtained in said steps ii) and iii) and playing the newly concatenated stream to maintain continuity between the previous stream and the newly concatenated channel.

Hereinafter, the detailed description for the method for channel change in digital broadcasting according to the present invention will be described in detail below. If the detailed descriptions of known techniques or technical constitutions relating to the present invention cause any confusion toward the main idea of the present invention, these specific descriptions may be omitted from the specification. Also, the following described terminology is defined based on the techniques of the present invention and may be interpreted differently based on the intention of the user or technical operator or the situation in which this information is being used. Therefore, the definitions of each term of the present invention are meant to be interpreted within the context of the present specification.

The technique for channel concatenation technique of the present invention, as used in current digital broadcasting technology, utilizes the MPEG2 transmission system (ISO/IEC 13818-1) as the standard format, and, if necessary, other similar standard formats may be applicable. In these cases, video may be applicable to video compression technologies, such as MPEG1-video (ISO/IEC 11172-2), MPEG2-video (ISO/IEC 13818-2), MPEG4-Visual (ISO/IEC 14496-2) etc., AVC/ITU-T Rec. H.264 (ISO/IEC 14496-10) and the like, which have picture structure including intra prediction and inter prediction, and audio may be applicable to audio compression technology including independent AU (access unit), such as MPEG-1 audio (ISO/IEC 11172-3), MPEG2-audio (ISO/IEC 13818-3), MPEG2-AAC (Advanced Audio Coding, ISO/IEC 13818/7) MPEG4-audio (ISO/IEC 14496-3), digital audio (ATSCA/52B) and the like.

Generally, within a broadcasting service system, the same type of video, audio format as well system formats of the same type consist as the basis for digital broadcasting, and media files are produced by identical presets. Therefore, information that is used when the decoder is initialized is usually identical.

If the initializing information for the decoder of media files is identical, and if required data for the same type of stream is possible with the process of decoding without re-initializing the decoder, the video and audio stream terminates and concatenates without re-initializing the decoder, required data and time information are linked, and the continual stream is renewed. With this, it is the technical feature of the present invention to reduce time delay and remove the appearance of the black picture by not initializing the decoder.

ADVANTAGEOUS EFFECT

As disclosed thus far, the present invention offers a novel method for channel change in digital broadcastings which involves a change of channel without reinitializing the decoder in order to concatenate two streams identically as one channel which minimizes time delay in a channel change and removes the appearance of the blank screen in between channels.

Up to this point, the description of the present invention has been limited to the preferred examples provided thus far. However, the present invention is not limited to these examples or their equivalents, and various changes and modifications may be made to the present invention accordingly. Thus, pertinent changes may be applied to the said examples.

Changes may also be practically applied to the stated technical aspects of the claims of the present invention.

DESCRIPTION OF DRAWINGS

FIG. 1 is a flow diagram showing the conventional channel changing method of digital broadcasting.

FIG. 2 is a flow diagram of one embodiment of the method for channel changing in digital broadcasting according to the present invention.

FIG. 3 shows possible points where the process of video stream concatenation can start in MPEG-2 video according to the present invention.

FIG. 4 is an embodiment of correcting the TS packet in order to complete video picture when the process of video stream concatenation starts in the case of MPEG-TS, according to the present invention.

FIG. 5 shows the possible points where the process of video stream can end in MPEG2-video according to the present invention.

FIG. 6 shows an embodiment of correcting the TS packet in order to complete video picture when the process of video stream concatenation ends in the case of MPEG-TS, according to the present invention.

FIG. 7 shows an embodiment of the removal of invalid inter prediction by changing Open GOP (Group of Pictures) to Closed GOP in the case of MPEG2-video, according to the present invention.

FIG. 8 shows an embodiment for concatenating the videos and time of 2 channel streams according to the present invention.

FIG. 9 is a schematic diagram of an embodiment for concatenating two channel streams in the present invention.

BEST MODEL

Hereinafter, the main techniques of the present invention will be described in detail.

1. Starting the Process of Video Stream Concatenation

Normal image can be obtained when video of the currently connected channel stream is completed at the level of independent AU (picture in the case of video). Consequently, when a channel change command is given, the picture which ends first after the channel change command will be searched, the video stream of the current channel will be completed, and the video stream of the channel to be concatenated will be received.

FIG. 3 shows possible points where the process of video stream concatenation can start in MPEG-2 video. As shown in FIG. 3, the point where any type of picture ends and is followed by another picture is the point where the process of video stream concatenation can start, completing the video stream as the unit of picture in the currently connected channel.

FIG. 4 is an embodiment of the completion of a video picture in the MPEG2-transport. When a picture of a TS packet is ended and the next picture is started, picture is completed at the level of TS packet by removing the next picture. If a stuffing_byte at the TS (Transport Stream) level may be used, or a PES header (Packetized Elementary Stream) is available, pes_padding_byte may be used. FIG. 4 shows an embodiment of a completed picture loading onto an completed system format by using a TS level stuffing_byte. As with MPEG-1, 2, if the system is processed at the system format level, the picture is ended at that system level following a similar principle.

Because the PES packet which contains the ES (Elementary Stream) of the new channel is concatenated, the length of the PES packet will change. The new PES packet length can be calculated, and in the case of the video elementary stream, the PES packet length may not need to be specified.

2. Ending the Process of Video Stream Concatenation

In the video picture, when a new video stream is concatenated, and a picture which is not intra-coded is started, some pictures from the new video stream will be referenced with the reference picture(s) of the old stream. This referencing, however, is not valid. Thus, unlike the point where the process of video stream concatenation starts, a possible point where the process of video stream concatenation can end shall be the starting point of an intra-coded picture that does not refer to other pictures. FIG. 5 shows the possible points where the process of video stream concatenation can end in MPEG-2 video. The point where the process of video stream concatenation can end is the starting point of I-picture (Intra picture) in the case of MPEG2-video, IDR (instantaneous decoding refresh) picture, or a picture which consists of I/SI slices only in the case of H.264.

The completion of the concatenated picture in the new stream shall be done in the same method as for the picture which is completed in the old stream. Similarly, if being processed in the system level, the video picture should be completed in the system level as well. FIG. 6 shows an embodiment of using a stuffing_byte in the MPEG2-TS level in order to complete the video picture in the system level. As it is the case with the video stream concatenation start, the PES packet length is adjusted accordingly.

If a picture, following the picture where the process of video stream concatenation has ended, refers to the pictures before the point where the process of video stream concatenation has ended for inter prediction, this referencing will not be valid and shall be removed. FIG. 7 shows an embodiment of removing the pictures which are after the point where the process of video stream concatenation ends and refer to the pictures before the point where the process of video stream concatenation ends for inter-prediction in MPEG2-video. If B5 and B6, between the point where the process of video stream concatenation ends and the picture P7, are Open GOP (Open group of pictures), they will usually refer to the pictures prior to I4. However, after the stream is concatenated to another stream from the starting point of I4, referring to the pictures before I4 will not be valid. Therefore, pictures which make invalid references, such as B5 and B6 shall be removed. Closed GOP do not make invalid references so they do not need to be removed. In the case of H.264, pictures subsequent to the IDR picture do not refer to the pictures prior to the IDR picture for inter prediction, so removal of pictures referring to the picture prior to the IDR picture where the process of video stream concatenation ends will not be needed. If the process of video stream concatenation ends at the beginning of an I/IS picture in H.264, pictures which refer to other pictures prior to the point where the process of video stream concatenation ends for inter prediction shall be removed.

In the case of MPEG2-TS, the TS packet loading pictures that need to be removed can be replaced with null packets and stuffing bytes. Removal of pictures which refer to the pictures before the point where the process of video stream concatenation ends can be removed in the same manner at other system levels.

In most broadcasting service systems, if 1. the video stream in which the process of video concatenation started and 2. another video stream in which the process of the video concatenation has ended are concatenated with each other and if the two video streams are of the same type, the two video streams will be concatenated and will be played as if they were a single stream without the decoder being reinitialized.

3. Time Concatenation

FIG. 8 shows an embodiment for finding the difference in time when concatenating two streams. For the sake of the present specification, the old stream will be called stream 1 and the new stream will be called stream 2. If a channel change command is detected, the process of video stream concatenation will start. As previously explained, at the end of any picture is a point where the process of video stream concatenation can start. Therefore, when there is a channel change command, the entirety of picture $v_i$, the first picture which ends after the channel change command in stream 1, will be received, and the reception of stream 1 will end at the point where picture $v_{i+1}$ starts. In other words, the process of video stream concatenation can start at a point where picture $v_i$ of stream 1 ends and picture $v_{i+1}$ of stream 2 starts.

When the video stream can be completed in stream 1, reception of stream 1 will stop and reception of stream 2 will start. The possible point where the process of video stream concatenation can end is the starting point of the first intra-coded picture in stream 2 after the channel change command. Let us assume the time difference between the point where the process of video stream concatenation can start in stream 1 and the point where the process of video stream concatenation can end in stream 2 be α, and the DTS (Decoding Time Stamp) of video frame $v_{i+1}$ be $DTS_{(v_{i+1})}$, the point where the process of video stream concatenation can start in stream 1. The decoding time stamp of I picture in stream 2 at the beginning of which the process of video concatenation ends will be changed into $DTS(I)_{new}$ as shown below, and stream 2 will be decoded based on the original bit rate of the stream 1. As a result, two streams will be continuously decoded with slight delay (α) in between them.

Because the interval/gaps of intra-coded pictures in the majority of streams are approximately 0.5 seconds, two video streams can be concatenated with reduced delay time compared to conventional methods, with an average time delay of about 0.25 seconds to the longest time delay of about 0.5 seconds.

$$DTS(I)_{new} = DTS_{(v_{i+1})} + \alpha \quad \text{[Equation 1]}$$

$DTS_{(v_{i+1})}$: DTS of picture $v_{i+1}$ at the beginning of which the process of video stream concatenation starts α=The physical time between the arrival of picture $v_{i+1}$ at the beginning of which the process of video stream concatenation starts and the arrival of picture I at the beginning of which the process of video stream concatenation ends.

$DTS(I)_{new}$: The target value of DTS of picture I at the beginning of which the process of video stream concatenation ends in the new stream In respect to frame I at the beginning of which the process of video stream concatenation ends in stream 2, let us assume the old DTS of frame I be DTS(I) and the new DTS be $DTS(I)_{new}$. Δ is defined in equation 2. Therefore, by adding Δ to all time stamps in stream 2 (MPEG-TS; pcr, pts, dts, etc.), continuity with stream 1 in terms of time duration can be maintained.

$$\Delta = DTS(I)_{new} - DTS(I) \quad \text{[Equation 2]}$$

$DTS(I)_{new}$: the new DTS of picture I at the beginning of which the process of video stream concatenation ends. Obtained from Equation 1.

DTS(I): the original DTS of picture I at the beginning of which the process of video stream concatenation ends.

Δ=the time difference to be applied to the newly concatenated stream.

4. Audio Concatenation

Audio AU must be ended as well. After a channel change command is given, the audio AU is terminated as the point where the process of video stream concatenation can start is being searched for. In order to obtain as much valid audio as possible, the most recently ended audio AU is decoded. Because the audio AU, which is received after the point where the video stream concatenation starts, cannot be completed, the audio AU which is not completed at the point where the video stream concatenation starts shall be removed.

After the point where the video stream concatenation starts, stream 2 starts to be received. As it is with the transmission system level, some audio AUs may not be complete at a point where the process of video stream concatenation starts and these incomplete audio AUs shall be removed.

Although each individual AU does not always contain time information, audio AU, unlike video picture, has substantial time continuity. Accordingly, anticipating DTS is possible in each individual audio frame. In the following process, in accordance with the Δ term in Equation 2, the time stamps of the new stream are changed and the old stream and the new stream will be concatenated based on the new time stamps. Thus, in order to avoid a time overlap between the old stream and the new stream, some audio AUs in the new stream are removed.

In order to terminate and remove an AU, a stuffing_byte is used and the AU is ended at the TS-packet level where the TS-packet is substituted with a TS null packet as described in the case of MPEG2-TS and video. A similar process can be used for different systems as well. Furthermore, in the case of MPEG-TS, there is a change in the length of the PES packet, and the said process can be renewed in the same way as in the system format.

Although there is the problem of the lengthened duration which is required to change the channel when obtaining the necessary audio data, for the purpose of obtaining more valid audio, the audio frames can be obtained from the previous stream until the point where the video of the old stream is played and from the new stream from the point when the video of the new stream is played.

Furthermore, mute audio frames can be inserted for time continuity.

5. Information Renewal

In order to ensure the continuous nature of the two concatenated streams, the information renewing process is necessary in relation to the below mentioned provisions. General information continuity and time information continuity can be divided into different sections.

5.1 General Information Renewal

When necessary, the previous stream and new stream are put into a continuous state through renewal of the information at the system level. The following is information that shall be renewed at the system level, in the case of MPEG2-TS.

PAT (Program Association Table): after the PAT information of the previous stream is saved, all of PAT of the new stream is re-written by using the PAT information of the previous stream.

PMT (Program Map Table): after the PMT information of the previous stream is saved, all of the PMT of the new stream is re-written using the PMT information of the previous stream.

PID (Packet ID) information of TS packet: all of the PID of the new stream is substituted with the PID of the previous stream, because the PAT, PMT, etc. information has been substituted with the information of the previous stream.

Continuity Counter: increases the continuity of the continuity counter in every TS packet starting from stream 1.

5.2 Time Information Renewal

Δ, obtained from Equation 2, is the time stamp difference of the new stream. Likewise, the time information of the new stream is moved by Δ. The following is the information that is shall be renewed when using the MPEG-TS system format.

PCR time information: the new stream PCR value is substituted with the old stream PCR value plus Δ.

PTS time information: the new stream PTS value substituted with the old stream PTS value plus Δ.

DTS time information: the new stream DTS value substituted with the old stream DTS value plus Δ.

Hereinabove, the technical features of the present invention have been described. FIG. 9 shows a generalized process used in the present invention for concatenating the two streams.

When a command is given for a channel change, while searching for the point where the process of video stream concatenation can start, the AU is ended and the process of video stream concatenation begins. The data for renewal of information is then collected. When the point where the process of video stream concatenation can start is found, the most recently ended audio AU is decoded and the video picture is terminated. The reception of previous channel, stream 1, is then concluded and the reception of the following channel, stream 2, is initiated.

While searching for the point where the process of video stream concatenation ends, the audio AU is analyzed and undergoes buffering. When the point where the process of video stream concatenation ends is found, the time difference (Δ) described in Equation 1 and 2 is sought, and overlapping audio AUs are removed. Video picture is then closed and video stream concatenation is ended.

After the process of video stream concatenation ends, received data information is continuously renewed in the new stream, stream 2.

If necessary, irrelevant data corresponding to each individual format can be inserted in between the points where the process of video stream concatenation starts and ends respectively to maintain the bit rate. When using MPEG2-TS for example, TS null packets can be inserted in between the processes where video stream concatenation starts and ends respectively to match the predetermined bit rate.

As described thus far, the following will describe the detailed steps of the present invention.

1. Recognizing a command for a channel change while the currently connected channel is receiving transmission and being decoded.

2. Completing the old stream after a command for a channel change is received.

2-1. Determining the point where the process of video stream concatenation can start: finding any picture.

2-2. Completing the audio AU closest to the point where the process of video stream concatenation starts.

2-2-1. Completing the audio AU at the system level by inserting TS stuffing-byte and adjusting PES packet size in the case of MPEG2-TS.

2-3. Starting the process of video stream concatenation: Completing video picture.

2-3-1. Completing the video pictures at the system level by inserting the TS stuffing byte and adjusting PES packet size in the case of MPEG-TS.

2-4. Analyzing the information of the previous stream, during the process of step 2.

3. Receiving and concatenating a new stream without re-initialization of a decoder.

3-1. Determining the point where the process of video stream concatenation can end: Searching intra-coded pictures.

3-1-1. In the case of MPEG2-video, I-picture.

3-1-2. In the case of H.264, IDR picture or possibly I/SI picture 3-2. Removing uncompleted audio AU and completing audio AU.

3-2-1. Completing the audio AU at the system level by inserting TS stuffing_byte and adjusting PES packet size in the case of MPEG2-TS.

3-2-2. Removing time overlapped audio when concatenating audio.

3-2-3. Optionally, substituting the audio AU with TS null packets in the case of MPEG2-TS.

3-3. Finishing video stream concatenation: completing intra-coded pictures.

3-3-1. Completing video AU at the system level by inserting TS stuffing_byte and adjusting PES packet size, in the case of MPEG2-TS.

3-4. Removing invalid references in the new stream in regards to pictures after video the process of video stream concatenation ends.

3-4-1. Completing video AU at the system level by inserting TS stuffing_byte and adjusting PES packet size in the case of MPEG2-TS.

3-4-2. Optionally, substituting the pictures with TS null packet.

3-5. Obtaining the difference in time information of the new stream, (Δ of Equation 2) in order to maintain time continuity.

3-6. Analyzing the time information during the process of said step 3.

3-7. Optionally, inserting TS null packet in order to maintain bit rate, etc. in the case of MPEG2-TS, in said steps 2 and 3.

4. Renewing information continuously in the new stream.

4-1. Renewing the additional supplementary information analyzed from said steps 2-4 and 3-6 in the new stream.

4-2. A step wherein the difference in time information of step 3-5 is used and the time information is renewed in the new stream.

The invention claimed is:

1. A method for a channel change in digital broadcasting, comprising:
   1) recognizing a command for a channel change while the currently connected channel is being decoded and played at the digital broadcast terminal;
   2) starting the process of video stream concatenation to concatenate a new channel, terminating the currently connected channel, and maintaining the received video stream in case a command for a channel change is given in step 1);
   3) receiving and analyzing the data of the new stream for channel concatenation by:
      3-1) determining the point where the process of video stream concatenation can end;
      3-2) receiving the complete audio AU and removing uncompleted audio AU;
      3-3) ending the process of video stream concatenation after step 3-1);
      3-4) removing pictures which make invalid references in the newly concatenated stream during or after the process of video stream concatenation is taking place or ended in said step 3-3);
      3-5) calculating the time difference between the previous channel and the newly concatenated channel in order to maintain continuity of time by measuring the difference in time information using the following equation:

$$\Delta = DTS\ (I)_{new} - DTS\ (I),$$

where DTS $(I)_{new}$ is obtained from the equation
DTS $(I)_{new}$=DTS $_{(v_{i+1})}$+αDTS $(I)_{new}$ is the new DTS of picture I at the beginning of which the process of video stream concatenation ends,
DTS $_{(v_{i+1})}$ the DTS of the point where the process of video stream concatenation starts in the former stream,
α is the physical time distance between the arrival time of picture $(V_{i+1})$ at the beginning of which the process of video stream concatenation starts and the arrival of picture I at the beginning of which the process of video stream concatenation ends,
DTS $(I)_{new}$ is the new DTS of picture I at the beginning of which the process of video stream concatenation ends,
DTS (I) is the original DTS of picture I at the beginning of which the process of video stream concatenation ends,
Δ is the time difference to be applied to the time information of the newly concatenated stream; and
3-6) analyzing the information of the newly concatenated channel during the process of said step 3; and
4) receiving the newly concatenated channel stream, modifying information of the new stream based on the information obtained in step 3) in order to make the stream continuous with the previous stream.

2. The method of claim 1, wherein said step 2) comprises:
2-1) determining a point where the process of video stream concatenation can start when a command for a channel change is given;
2-2) completing the audio AU which is the closest to the point where the process of video stream concatenation starts;
2-3) completing the video picture of the currently connected channel and starting the process of video stream concatenation; and
2-4) analyzing the information of the previous stream.

3. The method of claim 2, wherein said step 2-2) is carried out through completion of the audio AU at the system level by inserting TS stuffing_byte and adjusting the PES packet size, in case of MPEG2-TS.

4. The method of claim 2, wherein step 2-3) is carried out through completion of the video picture in the system level by inserting TS stuffing_byte and adjusting PES packet size.

5. The method of claim 1, wherein said step 3-1) is carried out by determining the point where the process of video stream concatenation ends by searching intra-coded pictures.

6. The method of claim 5, wherein said intra-coded picture is, in the case of MPEG2-video, I picture.

7. The method of claim 5, wherein the intra-coded picture is, in the case of H.264, IDR picture or I/SI picture.

8. The method of claim 1, wherein said step 3-2) further comprises:
completing the audio AU at the system level by inserting TS stuffing_byte and adjusting PES packet size, in the case of MPEG2-TS.

9. The method of claim 1, wherein said step 3-2) further comprises:
removing audio AUs which overlap each other in terms of time.

10. The method of claim 1, wherein said step 3-2) further comprises:
substituting the audio AU with TS null packets in the case of MPEG2-TS.

11. The method of claim 1, wherein said step 3-3) further comprises:
determining the point where the process of video stream concatenation can end by searching intra-coded pictures.

12. The method of claim 11, wherein said step 3-3) further comprises:
completing the video AU in the system level by inserting TS stuffing_byte and adjusting PES packet size, in the case of MPEG2-TS

13. The method of claim 1, wherein said step 3-4) further comprises:
completing the video AU at the system level by inserting TS stuffing_byte and adjusting PES packet size, in the case of MPEG2-TS.

14. The method of claim 1, wherein said step 3-4) further comprises:
substituting the video AU with TS null packets, in the case of MPEG2-TS.

15. The method of claim 1, wherein said step 3) further comprises:
3-7) inserting TS null packets in order to maintain the bit rate after said step 3-5), in the case of MPEG2-TS.

16. The method of claim 1, wherein said step 4) comprises:
4-1) renewing information of the newly concatenated channel based on the information obtained in said steps 2-4) and 3-6) after said steps 2) and 3);
4-2) renewing the time information of the newly concatenated channel based on the information obtained from said step 3-5) after said steps 2) and 3).

* * * * *